(12) United States Patent
Gibble et al.

(10) Patent No.: US 9,213,496 B2
(45) Date of Patent: *Dec. 15, 2015

(54) METHOD, SYSTEM, AND PROGRAM FOR MOVING DATA AMONG STORAGE UNITS

(75) Inventors: Kevin Lee Gibble, Tucson, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 617 days.

This patent is subject to a terminal disclaimer.

(21) Appl. No.: 11/459,274

(22) Filed: Jul. 21, 2006

(65) Prior Publication Data

US 2006/0294336 A1 Dec. 28, 2006

Related U.S. Application Data

(63) Continuation of application No. 10/231,815, filed on Aug. 29, 2002, now Pat. No. 7,103,731.

(51) Int. Cl.
*G06F 12/00* (2006.01)
*G06F 3/06* (2006.01)
*G11B 15/02* (2006.01)

(52) U.S. Cl.
CPC ............ *G06F 3/0647* (2013.01); *G06F 3/0608* (2013.01); *G06F 3/0686* (2013.01); *G11B 15/026* (2013.01)

(58) Field of Classification Search
CPC . G06F 3/0649; G06F 12/0253; G06F 3/0655; G06F 3/0647
See application file for complete search history.

(56) References Cited

U.S. PATENT DOCUMENTS

| 4,530,055 A | 7/1985 | Hamstra et al. |
| 5,043,885 A | 8/1991 | Robinson |

(Continued)

OTHER PUBLICATIONS

M. Werner et al., "Magstar Peer-to-Peer Virtual Tape Server Planning and Implementation Guide", IBM Corp., Dec. 2000, Document No. SG24-6115-00, Chapters 1 and 2.

(Continued)

*Primary Examiner* — Reginald Bragdon
*Assistant Examiner* — Thanh D Vo
(74) *Attorney, Agent, or Firm* — William K. Konrad; Konrad, Raynes, Davda and Victor LLP

(57) ABSTRACT

Provided are a method, system, and program for managing data in storage units. Storage pool information indicates an assignment of a plurality of storage units to a plurality of storage pools, wherein each pool is assigned zero or more storage units, wherein data associated with one storage pool is stored in a storage unit assigned to the storage pool, wherein the storage pool information for each pool indicates a threshold and target storage pool, and wherein the target storage pool is capable of being different from the storage pool. One storage unit associated with a source storage pool is selected and a determination is made of the threshold from the storage pool information for the source storage pool. A determination is made of whether the selected storage unit satisfies the determined threshold and if the selected storage unit satisfies the determined threshold, then a target storage unit in the target storage pool is selected if the storage pool information for the source storage pool indicates a target storage pool different from the source storage pool. Data from the selected storage unit is copied to the selected target storage unit.

27 Claims, 6 Drawing Sheets

(56) References Cited

U.S. PATENT DOCUMENTS

| | | | |
|---|---|---|---|
| 5,164,909 | A | 11/1992 | Leonhardt et al. |
| 5,253,351 | A | 10/1993 | Yamamoto et al. |
| 5,390,318 | A | 2/1995 | Ramakrishnan et al. |
| 5,412,780 | A | 5/1995 | Rushton |
| 5,546,557 | A | 8/1996 | Allen et al. |
| 5,584,008 | A | 12/1996 | Shimada et al. |
| 5,636,355 | A | 6/1997 | Ramakrishnan et al. |
| 5,644,766 | A | 7/1997 | Coy et al. |
| 5,673,382 | A * | 9/1997 | Cannon et al. ............... 714/6 |
| 5,790,828 | A | 8/1998 | Jost |
| 5,799,324 | A | 8/1998 | McNutt et al. |
| 5,829,023 | A | 10/1998 | Bishop |
| 5,875,481 | A | 2/1999 | Ashton et al. |
| 5,926,834 | A | 7/1999 | Carlson et al. |
| 5,933,840 | A | 8/1999 | Menon et al. |
| 5,956,301 | A | 9/1999 | Dimitri et al. |
| 6,038,490 | A | 3/2000 | Dimitri et al. |
| 6,067,599 | A | 5/2000 | Kishi et al. |
| 6,151,666 | A * | 11/2000 | Blendermann et al. ....... 711/170 |
| 6,163,773 | A | 12/2000 | Kishi |
| 6,304,880 | B1 | 10/2001 | Kishi |
| 6,336,163 | B1 | 1/2002 | Brewer et al. |
| 6,339,778 | B1 | 1/2002 | Kishi |
| 6,351,685 | B1 | 2/2002 | Dimitri et al. |
| 6,356,977 | B2 | 3/2002 | Ofek et al. |
| 6,725,241 | B1 | 4/2004 | Rodriguez et al. |
| 6,952,757 | B2 | 10/2005 | Carlson et al. |
| 6,954,768 | B2 | 10/2005 | Carlson et al. |
| 6,954,831 | B2 | 10/2005 | Carlson et al. |
| 6,978,325 | B2 | 12/2005 | Gibble et al. |
| 6,985,916 | B2 | 1/2006 | Carlson et al. |
| 7,103,731 | B2 | 9/2006 | Gibble et al. |
| 7,249,218 | B2 | 7/2007 | Gibble et al. |
| 2002/0087822 | A1 | 7/2002 | Butterworth |
| 2003/0074523 | A1* | 4/2003 | Johnson ................... 711/112 |
| 2003/0196036 | A1 | 10/2003 | Gibble et al. |
| 2004/0044862 | A1* | 3/2004 | Carlson et al. ............ 711/161 |

OTHER PUBLICATIONS

IBM Corp., "Logical Grouping of Data Storage Media in a Library System", TDB, Voo. 35, No. 5, Oct. 1992, pp. 17-20.
PCT International Search Report, PCT/GB03/03551, dated Aug. 5, 2004.
PCT Written Opinion, PCT/GB03/03551, dated Sep. 7, 2004.
Reply to Written Opinion, PCT/GB03/03551, dated Oct. 15, 2004.
PCT/GB03/03551, International Preliminary Examination Report mailed Nov. 7, 2004.
A. Freedman, "The Computer Desktop Encyclopedia", 1996 The Computer Language Company Inc., cover, copyright, and p. 556.
R. Tretau, et al., "IBM Tivoli Storage Management Concepts", IBM Corp. copyright 1997, table of contact and chapter 8.
B. Kadleck, et al., "IBM TotalStorage Virtual Tape Server Planning, Implementing, and Monitoring", IBM Corp., copyright 1997, table of contents, and chapters 1 and 8.
IBM TDB, Mar. 1993, US. vol. 36, Issue 3, pp. 147-148, "Method for Dynamically Managing Virtual Storage Pools".
First Office Action dated Oct. 28, 2004, pp. 1-13, for U.S. Appl. No. 10/231,815, by inventors K.L. Gibble, et al.
Response dated Mar. 3, 2005, pp. 1-17, to First Office Action dated Oct. 28, 2004, pp. 1-13, for U.S. Appl. No. 10/231,815, by inventors K.L. Gibble, et al.
Final Office Action dated May 4, 2005, pp. 1-12, for U.S. Appl. No. 10/231,815, by inventors K.L. Gibble, et al.
Response dated Jul. 8, 2005, pp. 1-14, to Final Office Action dated May 4, 2005, pp. 1-12, for U.S. Appl. No. 10/231,815, by inventors K.L. Gibble, et al.
Third Office Action dated Aug. 17, 2005, pp. 1-12, for U.S. Appl. No. 10/231,815, by inventors K.L. Gibble, et al.
Response dated Nov. 21, 2005, pp. 1-13, to Third Office Action dated Aug. 17, 2005, pp. 1-12, for U.S. Appl. No. 10/231,815, by inventors K.L. Gibble, et al.
Second Final Office Action dated Feb. 10, 2006, pp. 1-11, for U.S. Appl. No. 10/231,815, by inventors K.L. Gibble, et al.
Response dated Apr. 10, 2006, pp. 1-12, to Second Final Office Action dated Feb. 10, 2006, pp. 1-11, for U.S. Appl. No. 10/231,815, by inventors K.L. Gibble, et al.
Notice of Allowance dated Apr. 24, 2006, pp. 1-6, for Second Final Office Action dated Feb. 10, 2006, pp. 1-12, for U.S. Appl. No. 10/231,815, by inventors K.L. Gibble, et al.

* cited by examiner

Logical Volume Record

Physical Volume Record

Pool Record

METHOD, SYSTEM, AND PROGRAM FOR MOVING DATA AMONG STORAGE UNITS

BACKGROUND OF THE INVENTION

1. Field of the Invention

The present invention relates to a method, system, and program for moving data among storage units.

2. Description of the Related Art

In a tape library system, a tape controller will perform a reclamation process to improve the utilization of the tape storage units. The reclamation process involves copying active data from one or more tapes having both inactive and active data to fewer tapes that only have active data. The tapes from which the data is copied are then added to a scratch pool of available tapes from which they may be selected and used to store future data. Empty tapes may be returned to a scratch pool or retained for exclusive use of the current pool. This process improves storage capacity utilization by aggregating active data from multiple tapes to a single tape that stores a greater percentage of active data. Reclamation is necessary because as data is modified, older versions of the data on various tapes becomes outdated or inactive. Tapes that have both inactive and active data are not fully utilized because data is written sequentially and inactive data cannot simply be replaced with active data.

A tape is scheduled for reclamation when the amount of active data in a tape reaches a reclamation threshold. In order to optimize tape utilization, the reclamation threshold would be set to a higher level to more frequently consolidate data from tapes with a lower utilization to a single tape with a higher utilization. However, the reclamation process consumes substantial tape library resources to move the data from tape to tape and can affect other tape library operations. For instance, the data movement that occurs during reclamation can interfere with the data movement to tape that occurs in a hierarchical storage management (HSM) system when data is migrated from a faster access storage device, such as an array of hard disk drives, to slower access storage device, such as tape. Setting the reclamation threshold to a higher level to increase tape utilization will increase the frequency of the reclamation process and thereby consume substantial tape library resources and perhaps interfere with other tape library operations, such as data migration when the tape library is used in a hierarchical storage management system.

On the other hand, setting the reclamation threshold lower will reduce the frequency of reclamation because the amount of active data must fall to a relatively low level before reclamation begins. Reducing the frequency of reclamation will consume less tape library resources and minimize interference with other tape library operations, such as data migration from disk to tape. However, reducing the frequency of reclamation allows tapes to remain with a lower storage capacity utilization because reclamation is not performed until the tape storage capacity utilization is at the lower threshold level. If storage capacity utilization is lower, then the data is dispersed across more tapes at a lower capacity utilization.

Thus, there is always a tradeoff of tape library performance and storage capacity utilization that must be considered when determining the reclamation threshold.

For these reasons, there is a need in the art for improved techniques for handling data reclamation in a storage system.

SUMMARY OF THE DESCRIBED IMPLEMENTATIONS

Provided are a method, system, and program for managing data in storage units. Storage pool information indicates an assignment of a plurality of storage units to a plurality of storage pools, wherein each pool is assigned zero or more storage units, wherein data associated with one storage pool is stored in a storage unit assigned to the storage pool, wherein the storage pool information for each pool indicates a threshold and target storage pool, and wherein the target storage pool is capable of being different from the storage pool. One storage unit associated with a source storage pool is selected and a determination is made of the threshold from the storage pool information for the source storage pool. A determination is made of whether the selected storage unit satisfies the determined threshold and if the selected storage unit satisfies the determined threshold, then a target storage unit in the target storage pool is selected if the storage pool information for the source storage pool indicates a target storage pool different from the source storage pool. Data from the selected storage unit is copied to the selected target storage unit.

In further implementations, at least two of the storage pools may have different thresholds.

Still further, the storage units in the source storage pool may have a lower storage capacity than the storage units in the target storage pool.

Yet further, the source storage pool may comprise a first storage pool, the target storage pool may comprise a second storage pool, wherein a third storage pool is identified as a target storage pool in the storage pool information for the second storage pool, and whereby data from one selected storage unit in the second storage pool is moved to the third storage pool when the threshold for the second storage pool is reached.

Described implementations provide techniques for managing data in storage pools and reclaiming data in a storage unit in one source pool in a storage unit in a different target storage pool, where the source and target storage pool may have different attributes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
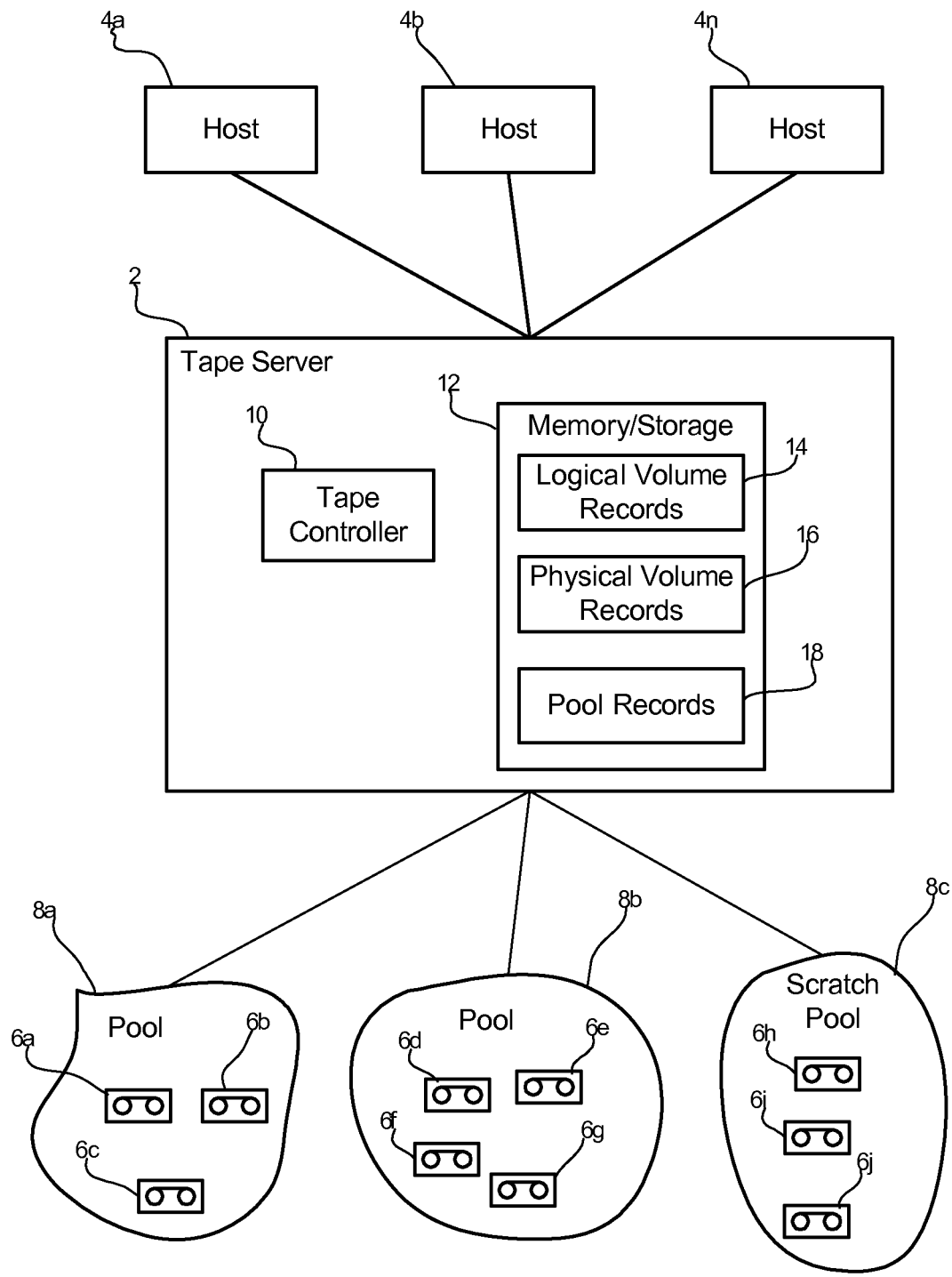
FIG. 1 illustrates a computing environment in which aspects of the invention are implemented.

FIG. 1 illustrates a computing environment in which aspects of the invention may be implemented. A tape server 2 provides host systems 4a, 4b . . . 4n access to logical volumes stored on tape cartridges (also referred to as physical volumes) 6a, 6b, 6c, 6d, 6e, 6f, 6g. In certain implementations, the tape cartridges 6a, 6b . . . 6g are organized into logical groups referred to as pools 8a, 8b. A tape controller 10 includes hardware and/or software to manage access to the tape cartridges 6a, 6b . . . 6g in the pools 8a, 8b and perform reclamation in accordance with implementations described herein. A scratch pool 8c includes tape cartridges 6h, 6i, and 6j that are empty, free and available for use with another pool if additional tape storage is needed for logical volumes in a pool.

Although FIG. 1 shows a certain number of tape cartridges and storage pools, any number of tape cartridges and storage pools may be used, where the storage pools may include any number of tape cartridges. The tape server 2 may comprise an automated tape library and include a gripper assembly (not shown) to access and load the tape cartridges 6a, 6b . . . 6j into one or more accessible tape drives (not shown) and include cartridge slots (not shown) to store the tape cartridges. In further implementations, the tape cartridges may be manually loaded into one or more tape drives accessible to the tape server 2.

The tape server 2 may comprise any tape library or tape controller system known in the art. The tape cartridges 6a, 6b . . . 6j may comprise any type of sequential access magnetic storage media known in the art, including Digital Linear Tape (DLT), Linear Tape Open (LTO), etc. The hosts 4a, 4b . . . 4n may comprise any computing device known in the art, such as a personal computer, laptop computer, workstation, mainframe, telephony device, handheld computer, server, network appliance, etc. The hosts 4a, 4b . . . 4n may connect to the tape server 2 via a direct cable connection or over a network, such as a Local Area Network (LAN), Wide Area Network (WAN), Storage Area Network (SAN), the Internet, an Intranet, etc.

Figure 2:
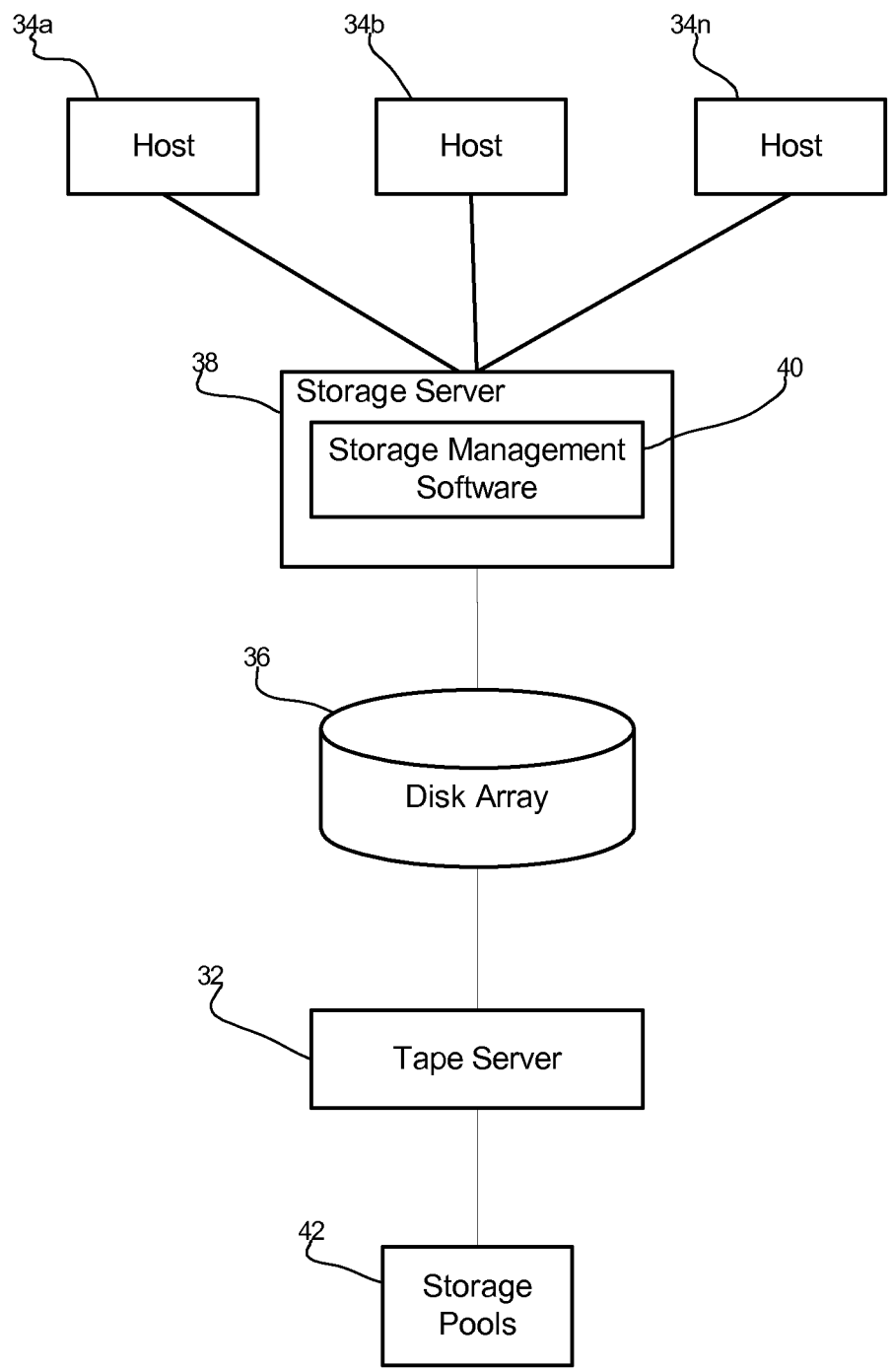
FIG. 2 illustrates an alternative computing environment in which aspects of the invention are implemented.

FIG. 2 illustrates an alternative implementation where the tape server 2 shown in FIG. 1 is included in a hierarchical storage management (HSM) system as tape server 32. The hosts 34a, 34b . . . 34n perform Input/Output (I/O) operations with respect to a disk array 36 through a storage server 38. The disk array 36 may comprise a single hard disk drive, a Redundant Array of Independent Disks (RAID), Just a Bunch of Disks (JBOD), or any other storage medium that allows for faster access than the storage medium managed by the tape server 32. The storage server 38 may comprise any server class machine suitable for handling I/O requests from multiple sources, such as an enterprise class storage server. In certain implementations, the storage server 38 includes storage management software 40, which manages the migration of data from the disk array 36 to the tape server 32 for storage on tapes (physical volumes) in storage pools 42, such as the storage pools 8a, 8b shown in FIG. 1. In certain implementations, the storage management software 40 may migrate data from the disk array 36 to the tape server 32 using hierarchical storage management (HSM) algorithms and techniques known in the art, such as the HSM operations implemented in the Tivoli® Space Manager products (Tivoli is a registered trademark of International Business Machines Corporation).

In still further implementations, the storage management software 38 may implement virtual tape server functions so that the hosts 34a, 34b . . . 34n use tape access operations to access data in the disk array 36, where the disk array 36 operates as a large high speed buffer for the tape storage, relative to the slower access tape cartridge medium. The hosts 34a, 34b . . . 34n may use tape I/O commands to access data in the disk array 36 as tape logical volumes. The storage management software 38 would use HSM algorithms to migrate data from the disk array 36 to the tape server 32. The storage management software 38 may include virtual tape server software known in the art, such as the software used with the IBM TotalStorage™ Virtual Tape Server (TotalStorage is a trademark of IBM) to implement a virtual tape server environment.

Thus, the tape server 2, 32 that is performing reclamation operations may be directly connected to the hosts performing the tape operations or may receive data from a disk array as part of HSM migration, a virtual tape server system, backup or other data management operations performed at the disk array level. Additionally, the tape server 32 could be contained within the storage server 38.

In certain implementations, system administrators can assign physical volumes to pools to allow classification of tapes according to some predefined criteria. For instance, in an organization, there may be separate storage pools of tape cartridges for different units within the organization. In a corporate organization, there may be separate storage pools for different departments, e.g., accounting, marketing, finance, engineering, etc., so that data from a particular department is stored on tape cartridges that only store that particular class of data. Alternatively, storage pools may be defined for data having different rates of usage. For instance, one pool may be for data that has been modified or accessed recently and another pool may be used for archived or backup data. Still further, pools may be designated for different groups of users, such as those with a high level of access, those with limited access, etc. Thus, the storage pools may be used to assign tape cartridges group data by class or type.

In certain implementations, the tape controller 10 maintains data structures in memory 12, including logical volume records 14, physical volume records 16, and pool records 18. The memory 12 may comprise a volatile memory device, e.g., a random access memory (RAM) or a non-volatile storage, e.g., a hard disk drive. These records may be maintained in a relational or object oriented database, a table or any other data structure known in the art.

Figure 3A:
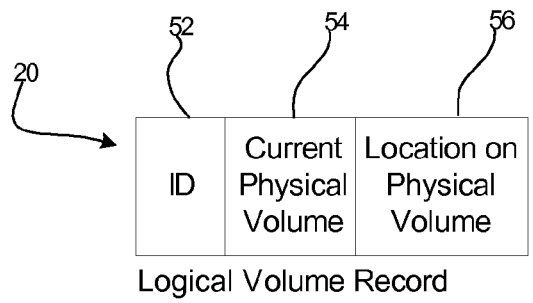
FIGS. 3a, 3b, and 3c illustrate data structures maintaining information on logical volumes, physical volumes and storage pools, respectively, in accordance with implementations of the invention.

FIG. 3a illustrates the information maintained in each logical volume record 50, where a logical volume record 50 is maintained for each logical volume stored in a tape cartridge 6a, 6b . . . 6g, including:

ID 52: an identifier of the logical volume.

Current Physical Volume(s) 54: identifies one or more physical volumes (tape cartridge 6a, 6b . . . 6j) including the logical volume. A logical volume may span multiple physical volumes or multiple logical volumes may be stored on a single physical volume. The pool in which the logical volume is assigned can be determined from the storage pool associated with the current physical volume including the logical volume.

Location on Physical Volume(s) 56: indicates the location of the logical volume on the one or more physical volumes including the logical volume.

Figure 3B:
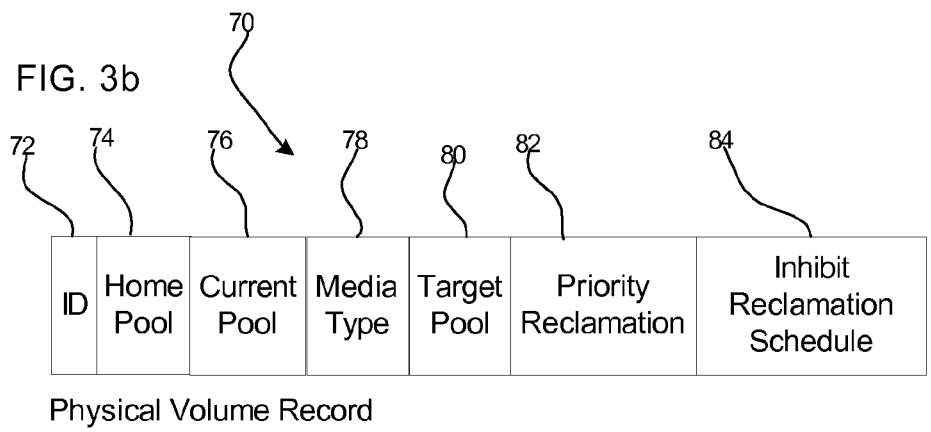

FIG. 3b illustrates the information in each physical volume record 70, where a physical volume record 70 is maintained for each physical volume or tape cartridge 6a, 6b . . . 6j that may be accessed by the tape server 2 through a tape drive, including:

ID 72: provides a unique identifier of a physical volume.

Home Pool 74: indicates the home pool to which the physical volume is assigned. If a physical volume (tape cartridge) is moved from one pool to another, than the home pool is reassigned to the target pool to which the physical volume is reassigned. A "borrow" changes only the current pool and the home pool remains the same. If a tape cartridge is borrowed two or more times, then the home pool will still specify the same pool from which the tape was initially borrowed, such as the scratch pool, but the current pool is changed.

Current Pool 76: indicates the current pool to which the physical volume is assigned, such that a physical volume stores data of the type associated with the current pool.

Media Type 78: Indicates a media type of the physical volume, such as "J" or "K".

Target Pool 80: the default indicates no target pool. If the field indicates a known storage pool, then this field indicates that the physical volume is involved in a pending move operation and is to be moved to the specified target pool after the active data from the physical volume is copied to an empty tape.

Priority Reclamation 82: indicates that reclamation for the physical volume occurs during the scheduled reclamation period, but the physical volume is assigned a higher reclamation priority than other cartridges to be reclaimed so that the physical volume is scheduled for reclamation before other tape cartridges to be reclaimed. The default may be that priority reclamation is off indicating that reclamation will occur during a normally scheduled reclamation period at the normal assigned reclamation priority.

Inhibit Reclamation Schedule 84: If the priority reclamation 82 indicates a priority reclamation, then this field may indicate to schedule the reclamation immediately, even if reclamation would occur outside of the scheduled reclamation period during a critical use time. If this inhibit option is not selected, then the priority reclamation would occur during the normal scheduled reclamation period.

Figure 3C:
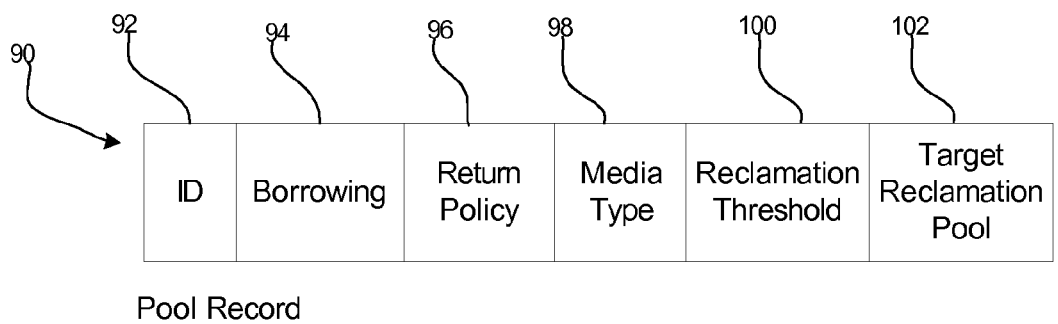

FIG. 3c illustrates the information maintained with a pool record 90, where there is one pool record 90 for each defined pool, including:

ID 92: provides a unique identifier of a pool. This ID may have a descriptive name indicating the type or class of data stored in the pool, e.g., accounting data, marketing data, research and development, archival data, high security users, etc. If a pool record 90 is maintained for the scratch pool, then the scratch pool may have a unique scratch pool identifier.

Borrowing 94: indicates whether physical volumes (tape cartridges) may be borrowed by the pool from the scratch pool.

Return Policy 96: indicates whether a physical volume (tape cartridge) moved from one pool to another must be returned to the home pool when the tape is reclaimed or released, i.e., the tape no longer has any active data.

Media Type 98: a field that indicates the media type(s) of physical volumes associated with the pool.

Reclamation Threshold 100: Indicates the reclamation threshold for the pool, which is the capacity utilization that triggers the reclamation process for tapes in the pool, such that a tape (physical volume) in the pool is reclaimed if its active data is less than the reclamation threshold for that pool. Each pool may have a different reclamation threshold.

Target Reclamation Pool 102: Indicates a storage pool to which data is copied from the tape cartridge in the current pool during reclamation. For instance, when reclamation is performed, the data on a cartridge in one storage pool is moved to a tape cartridge in the storage pool indicated in the reclamation pool field 102. This allows data to move to different storage pools to be reclaimed at different reclamation thresholds. If a different storage pool is not indicated in field 102 or if a default "undefined" value is indicated in field 102, then the data is reclaimed to the same storage pool.

Both the reclamation threshold 100 and target reclamation pool 102 values may be set by the system administrator for defined storage pools.

In certain implementations, the reclamation thresholds 100 indicated in the pool records 18 may be set at different levels for different pools. Thus, one pool may have a lower reclamation threshold than another pool. In one implementation, data may be initially stored in a storage pool having a low reclamation threshold 100 and a target reclamation pool 102 indicating a succeeding storage pool having a higher reclamation threshold 100. For instance, data may initially be stored on tapes in storage pool A that has a low reclamation threshold of say 10%. The target reclamation pool 102 for storage pool A may indicate storage pool B that has a high reclamation threshold, e.g., 90%. Thus, logical volumes reclaimed from tapes in storage pool A are stored in tapes in storage pool B, so that reclamation causes logical volumes to move from one storage pool to another.

In implementations where data moves from tapes in a lower reclamation threshold storage pool to a higher reclamation threshold storage pool, storage capacity utilization is optimized while the impact of reclamation operations on the tape server 2, 32 performance is minimized for the following reasons. Data stored in the first storage pool A may include data that is frequently updated, and thus expires at a fast rate, as well as data that is infrequently updated, such as archival data. Setting the reclamation threshold low for the first storage pool A ensures that reclamation occurs with respect to data that is infrequently accessed, such as archival data, because most of the frequently accessed data is inactive because it would have expired (i.e., been modified) before the low reclamation threshold is reached. Thus, reclamation at storage pool A with the low reclamation threshold would likely involve the movement of mostly infrequently accessed (archival) data to storage pool B. Data in storage pool B is reclaimed at a higher reclamation threshold to improve storage capacity utilization for the relatively less frequently accessed data. However, even though storage pool B has a higher reclamation threshold, reclamation will not substantially degrade tape server 4, 34 performance because the data in storage pool B is infrequently accessed and thus will not likely frequently expire so as to trigger reclamations at the higher reclamation threshold at a rate that degrades performance.

By using multiple storage pools with different reclamation thresholds, the initial storage pool effectively filters out frequently used data to move data that is relatively infrequently accessed to the next storage pool where a higher reclamation threshold can be used to improve storage capacity utilization with minimal effects on performance.

In further implementations, data can be reclaimed through more than two pools, where each pool through which the data is moved has an increasing reclamation threshold to provide an increased storage capacity utilization for data that is infrequently accessed. In this way, reclamation at each storage pool filters out the relatively more frequently accessed data so that the relatively infrequently used data in the storage pool is promoted to succeeding storage pools for storage on tapes at an increasing storage capacity utilization.

Figure 4:
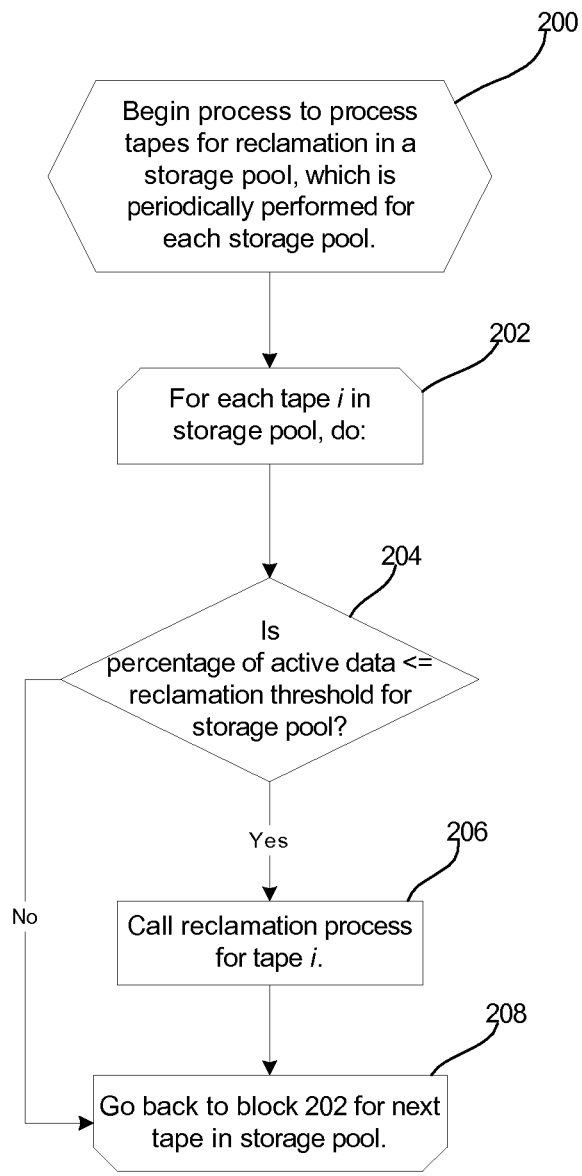
FIGS. 4 and 5 illustrates logic to perform tape reclamation operations in accordance with implementations of the invention.

FIG. 4 illustrates logic implemented in the tape controller 10 to select tapes 6a, 6b . . . 6g within one storage pool 8a, 8b for reclamation. Control begins at block 200 where the tape controller 10 selects one of the storage pools 8a, 8b in which to process tapes for reclamation. This process would be performed with respect to each storage pool 8a, 8b, other than the scratch pool 8c which includes empty tapes (physical volumes) 6h, 6i, 6j. A loop is performed at blocks 202 through 208 for each tape cartridge i in the selected storage pool 8a, 8b. If (at block 204) the percentage of active data is less than or equal to the reclamation threshold 100 indicated in the pool record 90 (FIG. 3c) for the selected storage pool 8a, 8b, then the tape controller 10 calls (at block 206) the reclamation process for tape i. In such case, the tape i would be subject to reclamation according to the logic of FIG. 5 during a predesignated reclamation period, which typically occurs during low use hours. After designating a tape to be reclaimed or if the active data on tape i does not fall below the reclamation threshold 100, then control proceeds to block 208 to consider the next tape in the selected pool for reclamation.

As discussed, because the reclamation threshold 100 can be set at different values for different storage pools 8a, 8b, the tapes in different storage pools may be subject to reclamation at different rates depending on their reclamation threshold.

Figure 5:
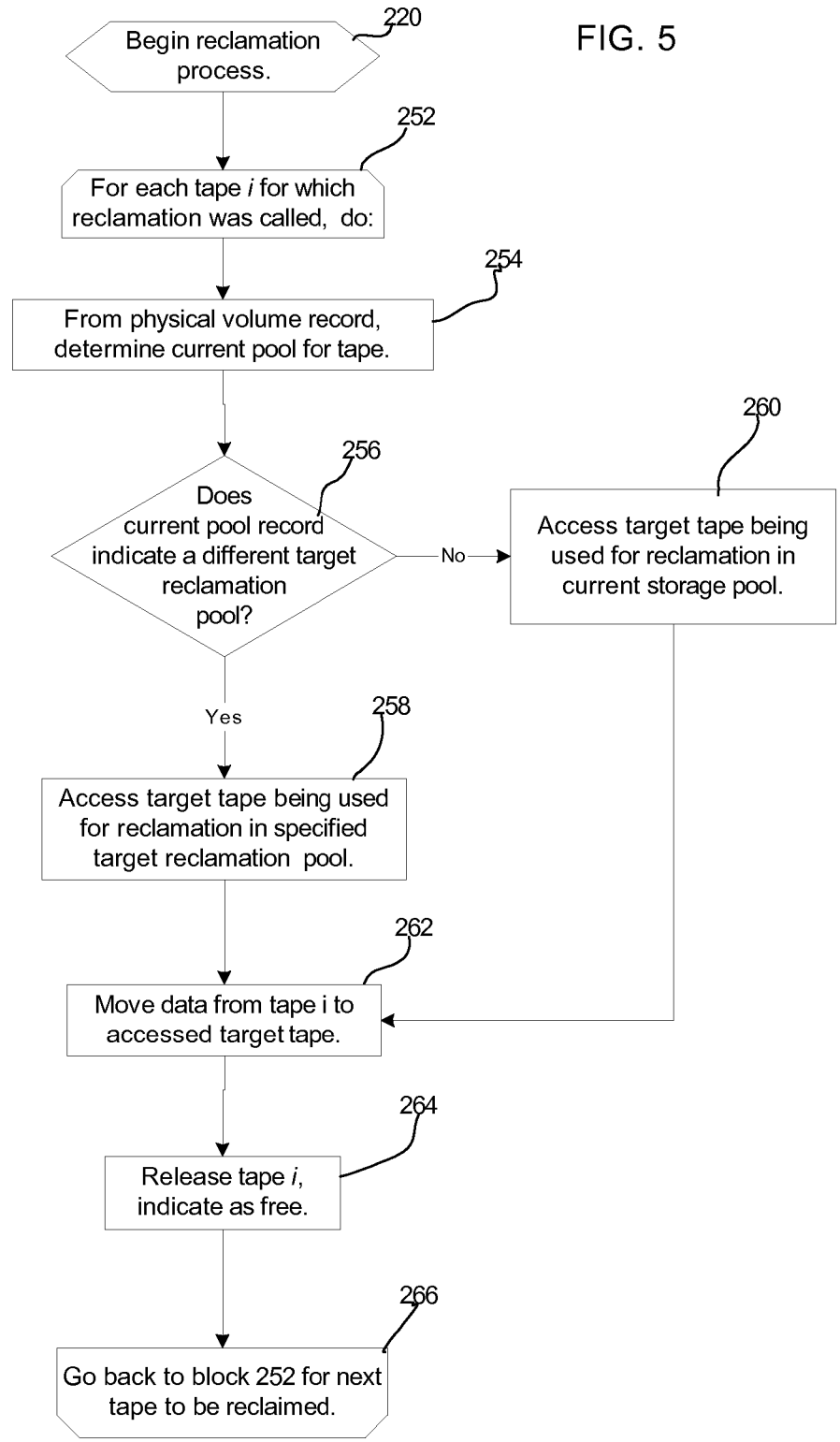

FIG. 5 illustrates logic implemented in the tape controller 10 to perform reclamation on tapes subject to reclamation according to the logic of FIG. 4. Control begins at block 250 with the initiation of the reclamation process, which may occur during regularly scheduled reclamation periods. Oftentimes reclamation is scheduled to occur during time periods at which the tape server 2, 32 is experiencing low usage so as not to interfere with normal tape drive operations. Alternatively, reclamation may occur soon after the tape controller 10 decides in FIG. 4 to subject a tape cartridge 6a, 6b . . . 6g to reclamation. A loop is performed at blocks 252 through 266 for each tape (physical volume) i subject to reclamation. The storage pool for tape i is determined (at block 254) from the current pool 76 field of the physical volume record 70 (FIG. 3b) for tape i. If (at block 256) the pool record 90 for the determined storage pool including tape i has a target reclamation pool 102 that is different from the storage pool including tape i, then the tape controller 10 accesses (at block 258) a target tape from the storage pool indicated in the target reclamation pool field 102. Otherwise, if the target reclamation pool field 102 does not indicate to reclaim to a different storage pool, then the tape controller 10 accesses (at block 260) a target tape from the current storage pool of tape i. After accessing a free target tape, the tape controller 10 moves (at block 262), or sequentially writes, the data from tape i to the accessed target tape and releases (at block 264) tape i as a free tape. Control then proceeds (at block 266) back to block 252 to perform reclamation with respect to the next tape scheduled for reclamation.

As discussed, the storage administrator may have data initially stored in a storage pool having a relatively lower reclamation threshold to flush out frequently accessed data, i.e., data that expires at a faster rate, and then reclaim the data from such initial storage pool to a succeeding storage pool having a higher reclamation threshold. Although the succeeding storage pool has a higher reclamation threshold, data may not be reclaimed more frequently because the data in the succeeding storage pool expires at a slower rate, thereby taking longer to reach the reclamation threshold. Further, as discussed, the succeeding storage pools may further designate a further succeeding reclamation storage pool in field 102 to cause data to be reclaimed through a series of different storage pools, where each succeeding pool may have a higher reclamation threshold than the previous pool.

In further implementations, the initial storage pool having the lower reclamation threshold and the next succeeding pool at the higher reclamation threshold may have different capacity tapes. In one implementation, the initial storage pool may have "J" tapes and the succeeding storage pool would have "K" tapes, where "K" media tapes have a greater storage capacity. In this way, the initial reclamation at the lower threshold would occur more frequently by placing the data on smaller capacity tapes to provide for more efficient recall. Storing the less frequently accessed data, e.g., archival data, in the succeeding storage pool on a larger capacity tape packs data at a higher utilization on the larger capacity tape to improve volumetric efficiency.

The described implementations provide techniques for increasing storage capacity utilization by allowing the use of higher reclamation thresholds in a manner that avoids triggering thresholds at a rate that would harm system performance.

Additional Implementation Details

The described techniques for reclaiming physical volumes in storage pools may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, the physical volumes subject to the storage pool management operations described herein, such as reclamation, were stored in tape cartridges. However, in alternative implementations, the physical volumes subject to the storage pool management operations may be stored in any non-volatile storage unit medium known in the art, including optical disks, hard disk drive, non-volatile Random Access Memory (RAM) devices, etc. In such alternative storage unit media, the server would include the necessary drives or interfaces through which data in the alternative storage unit component is accessed.

In the described implementations, each succeeding storage pool indicated in the target reclamation pool field 102 has a higher reclamation threshold than the preceding storage pool from which the data came. However, in alternative implementations, a succeeding target storage pool to which data is reclaimed may have a lower or equal reclamation threshold. Further, succeeding target storage pools may have reclamation thresholds that are higher or lower than the threshold in any of the preceding target storage pools.

In the described implementations, the reclamation threshold is satisfied if the data in the tape cartridge is less than the threshold amount. In alternative implementations, alternative thresholds and threshold measurements may be used.

The data structures shown in FIGS. 3a, 3b, and 3c show the records as having specific types of information. In alternative implementations, the logical volume, physical volume, and storage pool records may have fewer, more or different fields than shown in the figures.

In further implementations, the sequence of tape selection in FIG. 5 may be based on the amount of active data on the tape instead of an index.

In the described implementations, certain variables, such as n and i are used to denote integer values indicating a certain number of elements. These variables may denote any number when used at different instances with the same or different elements.

The illustrated logic of FIGS. 4 and 5 shows certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

Figure 6:
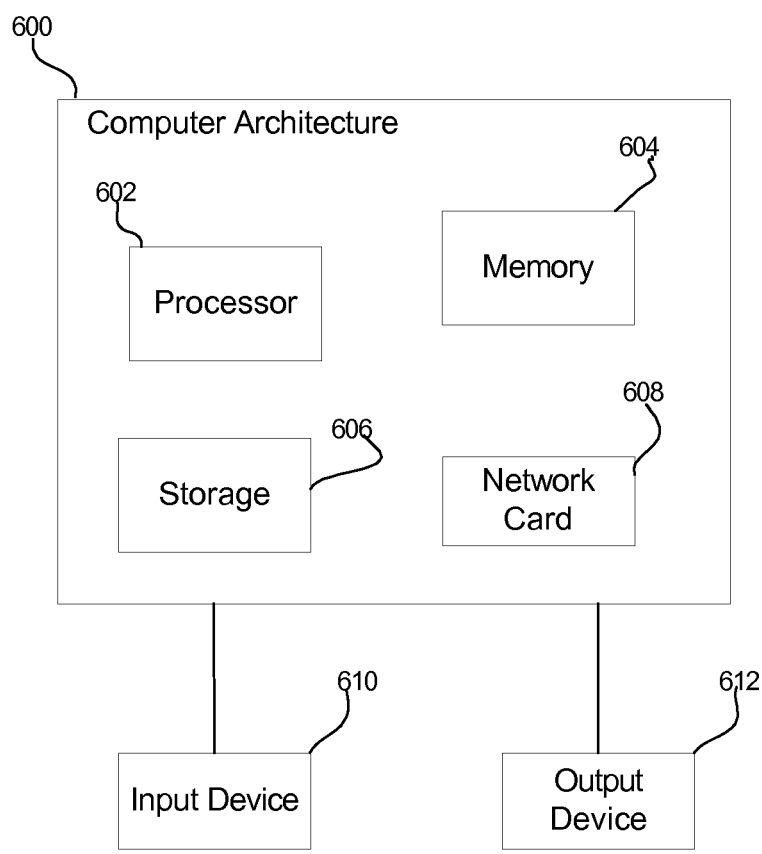
FIG. 6 illustrates an architecture of computing components in the computing environment, such as the hosts and tape server, and any other computing devices.

FIG. 6 illustrates one implementation of a computer architecture 600 that may be used in the hosts 4a, 4b . . . 4n and tape server 2 (FIG. 1). The architecture 600 may include a processor 602 (e.g., a microprocessor), a memory 604 (e.g., a volatile memory device), and storage 606 (e.g., a non-volatile storage, such as magnetic disk drives, optical disk drives, a tape drive, etc.). The storage 606 may comprise an internal storage device or an attached or network accessible storage. Programs in the storage 606 are loaded into the memory 604 and executed by the processor 602 in a manner known in the art. The architecture further includes a network card 608 to enable communication with a network. An input device 610 is used to provide user input to the processor 602, and may include a keyboard, mouse, pen-stylus, microphone, touch sensitive display screen, or any other activation or input mechanism known in the art. An output device 612 is capable of rendering information transmitted from the processor 602, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing data in storage units, comprising:

maintaining storage pool information indicating an assignment of a plurality of storage units to a plurality of storage pools, wherein each pool is assigned zero or more storage units, wherein data associated with one storage pool is stored in a storage unit assigned to the storage pool, wherein the storage pool information for each pool indicates a first threshold less than the capacity of a storage unit for the associated pool when used as a source storage pool and indicates a target storage pool associated with the source storage pool, and wherein the target storage pool has a second threshold less than the capacity of a storage unit for the associated pool and higher than the first threshold of the associated source storage pool, wherein the first threshold is a reclamation threshold indicative of capacity utilization that triggers a reclamation process of at least one of the plurality of storage units if its active data is less than the determined first threshold;

selecting one storage unit associated with a source storage pool;

determining the first threshold from the storage pool information for the source storage pool;

determining whether the selected storage unit satisfies the determined first threshold;

if the selected storage unit satisfies the determined first threshold, then selecting a target storage unit in the target storage pool having a second threshold higher than the determined first threshold of the source storage pool; and migrating data from the selected storage unit of the source storage pool to the selected target storage unit of the target storage pool having the second threshold higher than the determined first threshold of the source storage pool.

2. The method of claim 1, wherein the selected storage unit satisfies the determined first threshold if an amount of active data in the selected storage unit is less than the determined first threshold.

3. The method of claim 1, wherein the storage units in the source storage pool have a lower storage capacity than the storage units in the target storage pool.

4. The method of claim 1, wherein the source storage pool comprises a first storage pool, wherein the target storage pool comprises a second storage pool, wherein a third storage pool is identified as a target storage pool in the storage pool information for the second storage pool, and wherein data from one selected storage unit in the second storage pool is moved to the third storage pool when the second threshold for the second storage pool is reached.

5. The method of claim 1, wherein the source storage pool stores data transferred from a storage device.

6. The method of claim 5, wherein the storage device has a higher data access rate than the storage units.

7. The method of claim 5, wherein the storage units comprise tape cartridges, and wherein the storage device operates as a tape buffer to which data is written using tape Input/Output commands.

8. The method of claim 5, wherein the storage units comprise tape cartridges in a virtual tape server and wherein the storage device comprises a virtual tape buffer in said virtual tape server.

9. The method of claim 1, wherein the storage units comprise sequential access tape cartridges.

10. A system for managing data, comprising:

storage units;

means for maintaining storage pool information indicating an assignment of a plurality of storage units to a plurality of storage pools, wherein each pool is assigned zero or more storage units, wherein data associated with one storage pool is stored in a storage unit assigned to the storage pool, wherein the storage pool information for each pool indicates a first threshold less than the capacity of a storage unit for the associated pool when used as a source storage pool and indicates a target storage pool associated with the source storage pool, and wherein the target storage pool has a second threshold less than the capacity of a storage unit for the associated pool and higher than the first threshold of the associated source storage pool, wherein the first threshold is a reclamation threshold indicative of capacity utilization that triggers a reclamation process of at least one of the plurality of storage units if its active data is less than the determined first threshold;

means for selecting one storage unit associated with a source storage pool;

means for determining the first threshold from the storage pool information for the source storage pool;

means for determining whether the selected storage unit satisfies the determined first threshold;

means for selecting, if the selected storage unit satisfies the determined first threshold, a target storage unit in the target storage pool having a second threshold higher than the determined first threshold of the source storage pool; and means for migrating data from the selected storage unit of the source storage pool to the selected target storage unit of the target storage pool having the second threshold higher than the determined first threshold of the source storage pool.

11. The system of claim 10, wherein the selected storage unit satisfies the determined first threshold if an amount of active data in the selected storage unit is less than the determined first threshold.

12. The system of claim 10, wherein the storage units in the source storage pool have a lower storage capacity than the storage units in the target storage pool.

13. The system of claim 10, wherein the source storage pool comprises a first storage pool, wherein the target storage pool comprises a second storage pool, wherein a third storage pool is identified as a target storage pool in the storage pool information for the second storage pool, and wherein data from one selected storage unit in the second storage pool is moved to the third storage pool when the second threshold for the second storage pool is reached.

14. The system of claim 10, wherein the source storage pool stores data transferred from a storage device.

15. The system of claim 14, wherein the storage device has a higher data access rate than the storage units.

16. The system of claim 15, wherein the storage units comprise tape cartridges, and wherein the storage device operates as a tape buffer to which data is written using tape Input/Output commands.

17. The system of claim 14, wherein the storage units comprise tape cartridges in a virtual tape server and wherein the storage device comprises a virtual tape buffer in said virtual tape server.

18. The system of claim 10, wherein the storage units comprise sequential access tape cartridges.

19. A device for managing data in storage units, said device comprising a nontransitory computer readable storage medium, which stores instructions to be executed by a processor, the instructions causing operations to be performed, the operations comprising:

maintaining storage pool information indicating an assignment of a plurality of storage units to a plurality of storage pools, wherein each pool is assigned zero or more storage units, wherein data associated with one storage pool is stored in a storage unit assigned to the storage pool, wherein the storage pool information for each pool indicates a first threshold less than the capacity of a storage unit for the associated pool when used as a source storage pool and indicates a target storage pool associated with the source storage pool, and wherein the target storage pool has a second threshold less than the capacity of a storage unit for the associated pool and higher than the first threshold of the associated source storage pool, wherein the first threshold is a reclamation threshold indicative of capacity utilization that triggers a reclamation process of at least one of the plurality of storage units if its active data is less than the determined first threshold;

selecting one storage unit associated with a source storage pool;

determining the first threshold from the storage pool information for the source storage pool;

determining whether the selected storage unit satisfies the determined first threshold;

if the selected storage unit satisfies the determined first threshold, then selecting a target storage unit in the target storage pool having a second threshold higher than the determined first threshold of the source storage pool; and migrating data from the selected storage unit of the source storage pool to the selected target storage unit of the target storage pool having the second threshold higher than the determined first threshold of the source storage pool.

20. The device of claim 19, wherein the selected storage unit satisfies the determined first threshold if an amount of active data in the selected storage unit is less than the determined first threshold.

21. The device of claim 19, wherein the storage units in the source storage pool have a lower storage capacity than the storage units in the target storage pool.

22. The device of claim 19, wherein the source storage pool comprises a first storage pool, wherein the target storage pool comprises a second storage pool, wherein a third storage pool is identified as a target storage pool in the storage pool information for the second storage pool, and wherein data from one selected storage unit in the second storage pool is moved to the third storage pool when the second threshold for the second storage pool is reached.

23. The device of claim 19, wherein the source storage pool associated with includes storage units storing data transferred from a storage device.

24. The device of claim 23, wherein the storage device has a higher data access rate than the storage units.

25. The device of claim 24, wherein the storage units comprise tape cartridges, and wherein the storage device operates as a tape buffer to which data is written using tape Input/Output commands.

26. The device of claim 23, wherein the storage units comprise tape cartridges in a virtual tape server and wherein the storage device comprises a virtual tape buffer in said virtual tape server.

27. The device of claim 26, wherein the storage units comprise sequential access tape cartridges.

* * * * *